(12) United States Patent
Friedland

(10) Patent No.: US 7,476,999 B2
(45) Date of Patent: Jan. 13, 2009

(54) TORQUE PRODUCING DEVICE

(75) Inventor: Igor Friedland, Shoham (IL)

(73) Assignee: Elop Electro-Optics Industries Ltd. (IL)

(*) Notice: Subject to any disclaimer, the term of this patent is extended or adjusted under 35 U.S.C. 154(b) by 497 days.

(21) Appl. No.: 10/545,034

(22) PCT Filed: Dec. 18, 2003

(86) PCT No.: PCT/IL03/01091

§ 371 (c)(1),
(2), (4) Date: Aug. 11, 2005

(87) PCT Pub. No.: WO2004/082106

PCT Pub. Date: Sep. 23, 2004

(65) Prior Publication Data

US 2006/0131965 A1 Jun. 22, 2006

Related U.S. Application Data

(60) Provisional application No. 60/454,247, filed on Mar. 13, 2003.

(51) Int. Cl.
*H02K 1/22* (2006.01)
(52) U.S. Cl. .................. 310/264; 310/DIG. 48; 310/268
(58) Field of Classification Search .......... 310/264, 310/266, 268, DIG. 6, 195, 203, 208, 12, 310/15, 36, 13
See application file for complete search history.

(56) References Cited

U.S. PATENT DOCUMENTS

| | | | |
|---|---|---|---|
| 4,196,456 A | 4/1980 | Manzke et al. | 360/106 |
| 4,314,295 A | 2/1982 | Frandsen | 360/106 |
| 4,340,833 A * | 7/1982 | Sudo et al. | 310/268 |
| 4,490,635 A | 12/1984 | Harrison et al. | 310/38 |
| 4,509,109 A | 4/1985 | Hansen | |
| 4,626,717 A | 12/1986 | Hensing et al. | 310/36 |
| 4,658,162 A | 4/1987 | Koyama et al. | 310/68 R |
| 4,974,918 A | 12/1990 | Delache et al. | 350/6.6 |
| 5,097,355 A | 3/1992 | Eden | 359/213 |

(Continued)

OTHER PUBLICATIONS

International Search Report, PCT/IL2003/01091, dated May 7, 2004.

*Primary Examiner*—Dang D Le
(74) *Attorney, Agent, or Firm*—Cantor Colburn LLP

(57) ABSTRACT

Device (100) for producing torque, the device including an armature (102) made of a printed circuit board, at least one winding (124) formed on the armature in a substantially rectangular spiral path, at least one magnetic field inducer (108) and a counteractive-torque producing element (116) coupled with the armature, the armature being rotatable about a rotation axis, each of the magnetic field inducers being located in the vicinity of a respective corner of the substantially rectangular spiral path, each of the magnetic field inducers producing a magnetic field along a magnetic axis in a selected direction, the selected direction being opposite to another selected direction respective of an adjacent magnetic field inducer, each of the magnetic axes being substantially normal to the substantially rectangular spiral path, the windings and the magnetic field inducers applying the torque on the armature, when electric power is applied to the windings, the torque being at a torque level respective of a selected power level, the counteractive-torque producing element applying a counteractive torque on the armature in a direction opposite to that of the torque.

28 Claims, 5 Drawing Sheets

U.S. PATENT DOCUMENTS

| | | | |
|---|---|---|---|
| 5,187,612 A | 2/1993 | Plesko | 359/896 |
| 5,610,752 A | 3/1997 | Hayakawa | 359/198 |
| 5,703,555 A | 12/1997 | McCann | 335/272 |
| 6,144,281 A | 11/2000 | Lorris | |
| 6,421,208 B1 | 7/2002 | Oveyssi | 360/264.8 |
| 6,781,259 B2 * | 8/2004 | Hente | 310/12 |

* cited by examiner

TORQUE PRODUCING DEVICE

CROSS REFERENCE TO RELATED APPLICATIONS

This application is related to and claims the benefit of U.S. Provisional Patent Application Ser. No. 60/454,247 filed on 13 Mar. 2003. Furthermore, this application is filed under 35 U.S.C. 371 as the U.S. national phase of International Patent Application No. PCT/IL2003/001091 filed on 18 Dec. 2003 which claims priority to the aforementioned U.S. 60/454,247. Both of the quoted International and Provisional patent applications are hereby incorporated by reference in their entirety.

FIELD OF THE DISCLOSED TECHNIQUE

The disclosed technique relates to electric motors in general, and to methods and systems for producing torque, in particular.

BACKGROUND OF THE DISCLOSED TECHNIQUE

U.S. Pat. No. 6,144,281 issued to Lorris and entitled "Flexible Lead Electromagnetic Coil Assembly", is directed to a compact device for producing an electric field. The device is constructed of a flexible material in which a plurality of spiral coil nested conductor circuit sections are etched. The nested conductors are etched in a photochemical process on an epoxy resin substrate and covered with a vapor deposited insulation. The nested conductors are etched on both sides of the flexible material.

The nested conductors are formed on a longitudinally extending strip of the flexible material and the flexible material is wound to form a cylinder. The nested conductors are electrically interconnected. The cylinder is formed such that the centers of the nested conductors are 90 degrees apart. In a set of four nested conductors, two nested conductors which are 180 degrees apart, form an electric coil whose axis is perpendicular to the other two nested conductors in the set. The number of the nested conductors is an integer which is a multiple of four.

U.S. Pat. No. 4,509,109 issued to Hansen and entitled "Electronically Controlled Coil Assembly", is directed to a coil assembly in which the energization of the individual windings is electronically controlled. The coil assembly includes a pair of electrically conductive buses, a plurality of electrical conductors and a plurality of electronic control elements. The pair of electrically conductive buses are connected to a source of electrical energy and the pair of electrically conductive buses are further connected together by the electrical conductors. Each of the electronic control elements is connected in series with a respective one of the electrical conductors.

Each of the electronic control elements is a field effect transistor and a control signal is applied to the control gate thereof. In this manner, each of the electronic control elements controls the energization of the respective electrical conductor. The electrical conductors are formed on a flexible printed circuit board and the flexible printed circuit board is wound in a coil. A linear induction motor is formed by inserting an armature within the wound flexible printed circuit board.

U.S. Pat. No. 4,658,162 issued to Koyama et al., and entitled "Printed Coil Unit for Small Size Actuator", is directed to a thin flat brushless motor. The brushless motor includes a yoke plate, a printed coil unit, a magnet, a sensor element and a motor shaft. The motor shaft is connected with the magnet. The printed coil unit is located between the magnet and the yoke plate. Eight spiral conductor patterns are formed within the printed coil unit. Each of the spiral conductor patterns includes a pair of spiral conductor patterns. Each pair of spiral conductor patterns are electrically connected together by a thru-hole. The spiral conductor patterns are electrically interconnected. The ends of the first spiral conductor pattern and the last spiral conductor pattern are connected to two external electrode terminals.

The sensor element is a magneto-electric transducer element. The sensor element is embedded within the printed coil unit. The current supplied to the spiral conductor patterns is switched by a current switching transistor which is controlled by an electric signal produced by the magneto-electric transducer element. The magneto-electric transducer element detects the rotational or angular position of the magnet and the electric signal has a magnitude proportional to the detected field intensity.

U.S. Pat. No. 4,490,635 issued to Harrison et al., and entitled "Pure Torque, Limited Displacement Transducer", is directed to a rotary actuator for moving a data transducer radially across data tracks of a storage disk, during track seeking operations. The storage disk includes four disks supported by a drive hub. The drive hub is rotated by a motor. A frame supports the drive hub and the rotary actuator.

The rotary actuator includes a hub, a flux return top plate, a bias spring, a flat coil assembly, a magnet and an annular flux return plate. The hub is mounted to a data transducer carriage. A fixed shaft extends from the frame. Two ball bearings are located within the hub and the fixed shaft is located within the two ball bearings. An axial preload spring is located between the two ball bearings. The flux return top plate is secured to the frame. The bias spring extends from a standoff on the flux return top plate to the data transducer carriage.

The flat coil assembly is secured to a base of the hub. The annular flux return plate is secured to the frame and the annular flux return plate forms a base for the magnet. The flat coil assembly includes six triangular coil windings. Three of the triangular coil windings are connected in series and the other three triangular coil windings are connected in series in an opposite phase. The flat coil assembly is formed by placing the triangular coil windings in a forming mold and placing an epoxy potting compound in the mold.

When the currents in the triangular coil windings become imbalanced, a restoring torque is produced, which moves the data transducer carriage. When power is removed from the triangular coil windings, the bias spring returns the data transducer carriage to the inner landing zone of the four disks.

U.S. Pat. No. 5,703,555 issued to McCann and entitled "Rotary Actuator", is directed to a rotary actuator with end of travel magnetic latching capability. The rotary actuator includes a first stator piece, a second stator piece, a bobbin, two rotary poles, a rotor and a spring. The first stator piece and the second stator piece include a first stator pole and a second stator pole, respectively. Two pole risers are provided on the first stator pole, adjacent to a trailing edge thereof. The bobbin supports a coil. The coil is coupled to an outside power source. The rotary poles are connected with the rotor. The rotor rotates about a central axis. The spring urges the rotor to an axially unaligned position relative to the first stator pole and the second stator pole.

When no electric power is applied to the coil, the rotor is in the unaligned position. When electric power is applied to the coil, the rotor rotates until the leading edge of the rotary poles make contact with the pole risers. The pole risers provide a mechanical stop, which maintains the rotor at this position. The leading edge refers to a position of the first stator pole, where the rotary poles are located relative to the first stator pole at the beginning of rotation of the rotor and the trailing edge refers to this relative position at the end of rotation of the rotor.

U.S. Pat. No. 4,626,717 issued to Hensing et al., and entitled "Pivotably Oscillating Motor Having Simple Armature Pole Elements", is directed to an oscillating motor. The oscillating motor includes a magnetizable stator, an armature, a motor shaft, a first coil, a second coil, a magnetizable core, a first magnet and a second magnet. The magnetizable stator includes two recesses to prevent magnetic short circuit. The armature includes a first pole element and a second pole element at the two ends thereof. The first coil and the second coil are wound around the magnetizable core. The motor shaft is located at the center of the magnetizable core and the armature is connected with the motor shaft. The magnetizable core, the first magnet and the second magnet are located within the magnetizable stator.

Air gaps are formed between the magnetizable core and the magnetizable stator. When the first coil and the second coil are energized, an alternating current flows through the turns of the first coil and the second coil and an alternating magnetic field is produced around the first coil and the second coil. The alternating magnetic field cooperates with the magnetic field produced by the first magnet and the second magnet and magnetic forces act on the first pole element and on the second pole element. The magnetic force causes the armature to oscillate about the motor shaft, while the first pole element and the second pole element are alternately drawn in the air gaps.

U.S. Pat. No. 4,974,918 issued to Delache et al., and entitled "Device with Oscillating Mirrors for Deviating Electromagnetic Beams", is directed to a device which oscillates when an electric current is applied thereto. The device includes a magnet, a first exterior magnet, a second exterior magnet, a middle magnet, a mirror, a winding and an elastic support. The first exterior magnet, the second exterior magnet and the middle magnet are connected to the magnet. The middle magnet is located between the first exterior magnet and the second exterior magnet.

The mirror is glued to the elastic support and the elastic support is glued to the middle magnet. The winding is connected to the mirror, thereby forming a mirror-winding assembly. When electric current is applied to the winding, the mirror-winding assembly oscillates between two extreme positions.

U.S. Pat. No. 5,097,355 issued to Eden and entitled "Scanning Device", is directed to a device which performs vibratory motions at a predetermined amplitude and frequency. The device includes a support member, a circular wire coil, a permanent magnet, a mirror and a plurality of flex pivots. The circular wire coil is attached to the support member. The permanent magnet is attached to the mirror. The mirror is attached to the support member by the flex pivots, thereby enabling the mirror to rotate back and forth about a rotation axis perpendicular to the longitudinal axis of the support member. When the circular wire coil is attached to a suitable power source for a brief period of time, the mirror oscillates about the rotation axis, for a duration an and angle which depends on the frequency of the current through the circular wire coil.

U.S. Pat. No. 5,610,752 issued to Hayakawa and entitled "Optical Reader with Vibrating Mirror", is directed to a vibrating mirror assembly employed in an optical reader, such as a bar code reader. The vibrating mirror assembly includes a coil, a mirror, a movable bar magnet, a shaft, a yoke, a holder, a top bearing and a bottom bearing. The holder includes a top ledge and a bottom ledge.

The top ledge and the bottom ledge extend from a back side of the holder. The coil is wound around the holder. The mirror is mounted on the movable bar magnet. The top bearing is attached to the top ledge and the bottom bearing is attached to the bottom ledge. The movable bar magnet is attached to the shaft. The shaft rotates within the top bearing and the bottom bearing. The movable bar magnet is located within the coil. The coil is located within the yoke. When an alternating signal or pulses are applied to the coil, the movable bar magnet vibrates about the shaft.

SUMMARY OF THE DISCLOSED TECHNIQUE

It is an object of the disclosed technique to provide a novel method and system for providing oscillatory motion of an armature.

In accordance with the disclosed technique, there is thus provided a device for producing torque. The device includes an armature made of a printed circuit board, at least one winding formed on the armature in a substantially rectangular spiral path, at least one magnetic field inducer and a counteractive-torque producing element coupled with the armature.

The armature is rotatable about a rotation axis. Each of the magnetic field inducers is located in the vicinity of a respective corner of the substantially rectangular spiral path. Each of the magnetic field inducers produces a magnetic field along a magnetic axis in a selected direction, the selected direction being opposite to another selected direction respective of an adjacent magnetic field inducer.

Each of the magnetic axes is substantially normal to the substantially rectangular spiral path. The windings and the magnetic field inducers apply the torque on the armature when electric power is applied to the windings. The torque is at a torque level respective of a selected power level. The counteractive-torque producing element applies a counteractive torque on the armature in a direction opposite to that of the torque.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a substantially thin and rigid laminated armature, within which a plurality of interconnected spiral rectangular windings are embedded in a plurality of layers. Four magnets are located on a plate substantially parallel with the laminated armature, wherein the location of each of the magnets corresponds with a different corner of a rectangular path of the interconnected spiral rectangular windings. A shaft is coupled with the laminated armature and the rotation of the shaft is restricted by a spring coupled with the shaft. When an electric power is applied across the interconnected spiral rectangular windings, the armature rotates by a selected angle when the magnetomotive force generated by the electric power in the interconnected spiral rectangular windings, substantially equals the spring force. When the electric power is disconnected, the magnetomotive force approaches zero and the spring force returns the armature to the initial position.

The term "winding" in the description herein below, refers to one or more turns of wire forming a continuous coil for a transformer, relay, rotating machine, or other electric device.

Figure 1A:
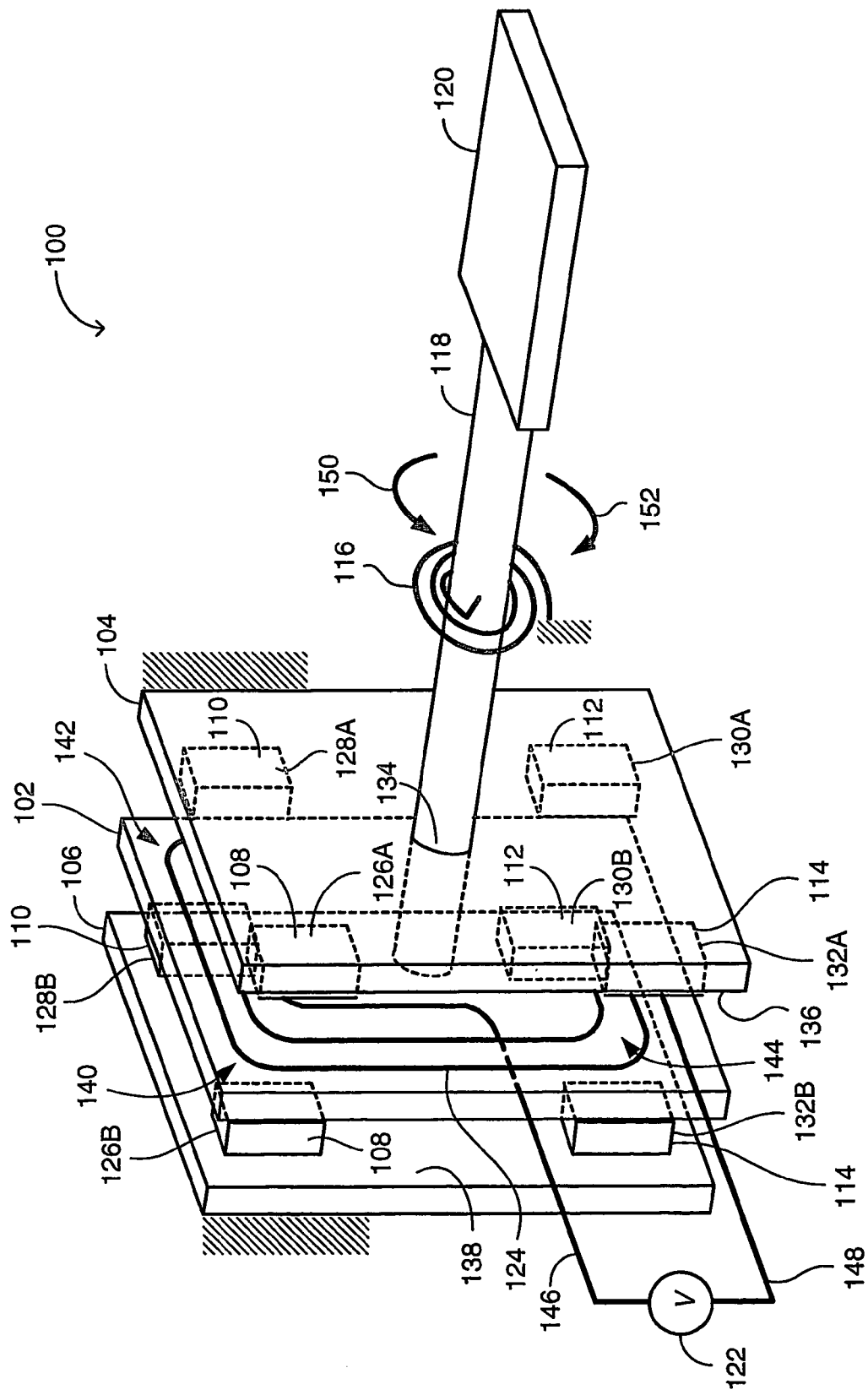
FIG. 1A is a schematic illustration of a torque producing device, constructed and operative in accordance with an embodiment of the disclosed technique.
Figure 1C:
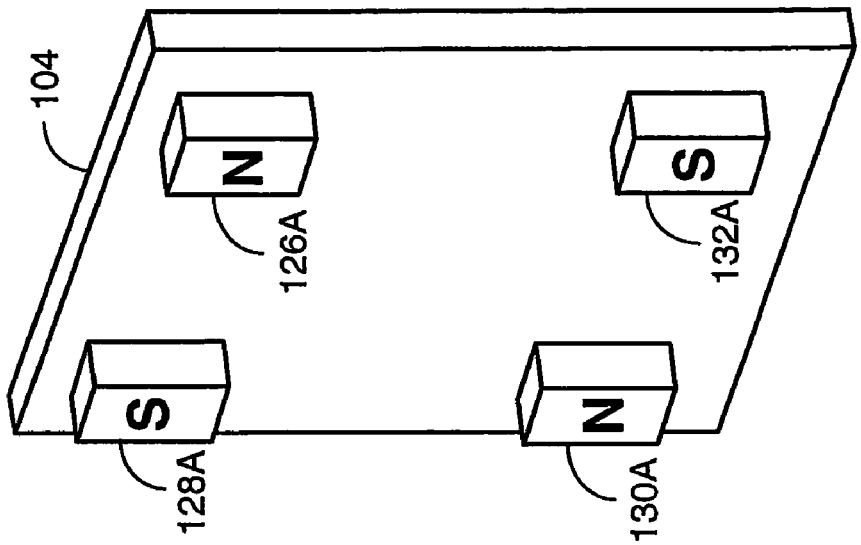
FIG. 1C is a schematic front view illustration of the other plate of the device of FIG. 1A.
Figure 1B:
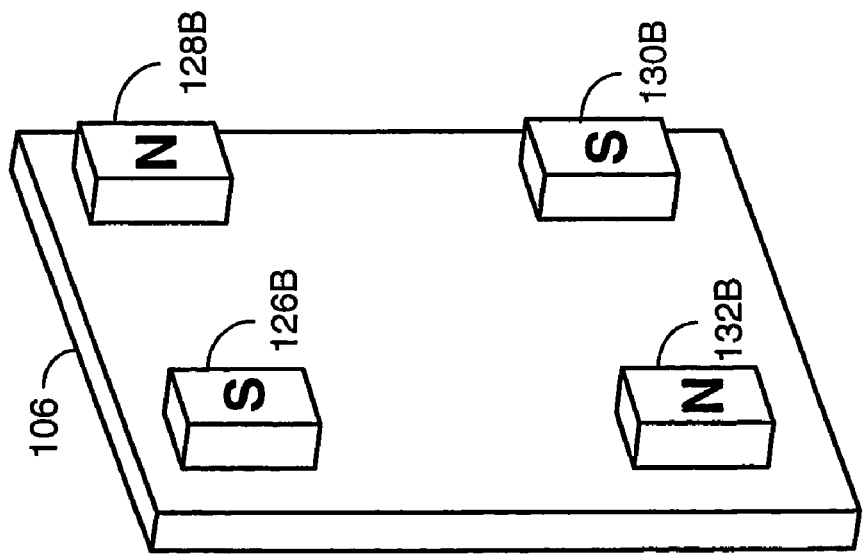
FIG. 1B is a schematic front view illustration of one of the plates of the device of FIG. 1A.

Reference is now made to FIGS. 1A, 1B and 1C. FIG. 1A is a schematic illustration of a torque producing device, generally referenced 100, constructed and operative in accordance with an embodiment of the disclosed technique. FIG. 1B is a schematic front view illustration of one of the plates of the device of FIG. 1A. FIG. 1C is a schematic front view illustration of the other plate of the device of FIG. 1A.

Device 100 includes an armature 102, plates 104 and 106, magnetic field inducers 108, 110, 112 and 114, a counteractive-torque producing element 116, a shaft 118, a light reflector 120 and an electric power source 122. Armature 102 includes a plurality of windings generally referenced 124.

Armature 102 is made of a substantially thin and rigid dielectric material, such as a combination of epoxy and fiberglass (i.e., printed circuit board—PCB), and the like, whose density is substantially small. Windings 124 are formed on armature 102 in a photolithography process, in substantially flat rectangular spiral paths made of an electrically conductive material, such as lead, silver, gold, copper, nickel, tin, indium, and the like. Armature 102 is a multi-layer PCB, wherein a different winding is formed on each layer and the windings are electrically interconnected, as described herein below in connection with FIGS. 3A, 3B, 3C and 3D.

Each of plates 104 and 106 is made either of a magneto-conductive metal such as magnetically soft steels and alloys material, such as magnetic soft steel, steel alloys, and the like, or a rigid non-magnetic material, such as aluminum, polymer, glass, and the like. Magnetic field inducer 108 includes portions 126A and 126B. Magnetic field inducer 110 includes portions 128A and 128B. Magnetic field inducer 112 includes portions 130A and 130B. Magnetic field inducer 114 includes portions 132A and 132B. Each of magnetic field inducers 108, 110, 112 and 114, is an object which produces a magnetic field. Each of magnetic field inducers 108, 110, 112 and 114, can be a permanent magnet electromagnet, and the like. The permanent magnet can be in the form of a solid, powder metal, and the like. The electromagnet includes a coil which is coupled with an electric power source and which either includes ferrous core or is devoid of the core.

Counteractive-torque producing element 116 is an element which stores mechanical energy, such as a mechanical spring, a magnet spring, a fluid spring, and the like. The mechanical spring can be a plate spring, spiral coiled spring, cylindrical helical spring, conical helical spring, and the like. In the example set forth in FIG. 1A, the mechanical spring is a spiral coiled spring. The magnet spring can be in form of one or more pairs of electromagnets or permanent magnets, which absorb the motions of the shaft, as a result of attraction or repulsion magnetomotive forces. The fluid of the fluid spring can be a gas, such as air, argon, and the like, confined in a pneumatic cylinder. The fluid can be a liquid, such as a hydraulic fluid confined in a hydraulic cylinder. Shaft 118 is in form of a rod made of a metal, polymer, glass, and the like.

Light reflector 120 is made of a reflective material, such as silver, chrome, mercury, aluminum, and the like. Electric power source 122 can provide either direct current (or voltage) or alternating current (or voltage).

Plates 104 and 106 are fixed to a housing (not shown) of device 100. One end of shaft 118 is coupled with the center of armature 102 and the other end thereof is coupled with light reflector 120. Shaft 118 is supported by one or more bearings (not shown). The longitudinal axis of shaft 118 is substantially perpendicular to the surface of armature 102. Counteractive-torque producing element 116 is coupled with shaft 118 and with the housing. Armature 102 is located between plates 104 and 106, such that shaft 118 passes through a hole 134 in plate 104.

Portions 126A, 128A, 130A and 132A of magnetic field inducers 108, 110, 112 and 114, respectively, are located on a surface 136 of plate 104 facing windings 124. Portions 126B, 128B, 130B and 132B of magnetic field inducers 108, 110, 112 and 114, respectively, are located on a surface 138 of plate 106 facing windings 124. Portions 126A and 126B of magnetic field inducer 108 are located in the vicinity of a corner 140 of the rectangular spiral paths of windings 124. Portions 128A and 128B of magnetic field inducer 110 are located in the vicinity of a corner 142 of the rectangular spiral paths of windings 124. Portions 132A and 132B of magnetic field inducer 114 are located in the vicinity of a corner 144 of the rectangular spiral paths of windings 124. Portions 130A and 130B of magnetic field inducer 112 are located in the vicinity of another corner (not shown) of the rectangular spiral paths of windings 124.

Each of magnetic field inducers 108, 110, 112 and 114 produces a magnetic field along an axis substantially perpendicular to the substantially flat rectangular spiral paths of windings 124. The direction of the magnetic field produced by one magnetic field inducer, is opposite to the one produced by an adjacent magnetic field inducer.

In the example set forth in FIGS. 1A, 1B and 1C, each of portions 126A, 126B, 128A, 128B, 130A, 130B, 132A and 132B, is a permanent magnet. The magnetic poles of each pair of portions 126A and 126B, 128A and 128B, 130A and 130B, and 132A and 132B, are opposite. For example, the north pole of portion 126A faces corner 140, while the south pole of portion 126B faces same corner 140. Furthermore, the magnetic poles of portions 126A, 128A, 130A and 132A, are alternately and respectively, north, south, north and south. Likewise, the magnetic poles of portions 126B, 128B, 130B and 132B, are alternately and respectively, south, north, south and north. Thus, the magnetic poles of magnetic field inducers 108 and 112 are opposite to those of magnetic field inducers 110 and 114. Since surfaces 136 and 138 are substantially parallel with the surface of armature 102, the axes of the magnetic fields produced by magnetic field inducers 108, 110, 112 and 114, are substantially normal to the substantially flat rectangular spiral paths of windings 124.

The two ends (not shown) of windings 124 are coupled with electric power source 122 via wirings 146 and 148. Wirings 146 and 148 are flexible enough to allow armature 102 to rotate. They can be thread through shaft central hole. If the shaft is in form of a tube, then the wirings can pass through the tube, from the electric power source to the windings.

When electric power source 122 applies electric power to windings 124, the interaction of the electric current flowing in windings 124 and the magnetic fields of magnetic field inducers 108, 110, 112 and 114, produces a torque $T_M$ on armature 102. Torque $T_M$ acts against a torsion load, such as the spring force of spring 116, the angular momentum of an object (e.g., light reflector 120), friction force (e.g., that of a friction bearing), and the like. Torque $T_M$ is the result of a resultant force $F_M$ which acts at a radius $r_M$ from the center of armature 102. Thus, $$T_M = r_M \cdot F_M \quad (1)$$

and according to Lorentz force law, $$F_M = i \times B \quad (2)$$

where i is the electric current flowing in windings 124 and B is the resultant magnetic flux density of magnetic field inducers 108, 110, 112 and 114. Torque $T_M$ is resisted by a torque $T_S$ of counteractive-torque producing element 116. Torque $T_S$ is produced by a force $F_S$, such as a spring force, acting about a moment arm $r_S$. Armature 102 and thus shaft 118, rotates by an angle α and remains at this position, when $$T_M = T_S \quad (3)$$

When electric power source 122 ceases to apply electric power to windings 124, torque $T_M$ approaches zero, torque $T_S$ acts on shaft 118 in the opposite direction and thus, armature 102 returns substantially to the initial position thereof. In case counteractive-torque producing element 116 is a spring, the spring stores the kinetic energy produced as a result of the rotation of armature 102, and releases this kinetic energy when the torque $T_M$ is substantially zero, thereby rotating armature 102 in the opposite direction. In a sense, armature 102 can be regarded as the rotor and plates 104 and 106 as the stator of device 100.

A controller (not shown) can be coupled with electric power source 122, wherein the controller controls one or more electric parameters of electric power source 122, such as the polarity of the power output (i.e., the direction of flow of the current), the value of the output voltage (or current), the rate of change of the direction of flow of the current, the rate of change of the value of the current, and the like. When alternating the polarity of electric power source 122, and thus alternating the direction of the electric current flowing in windings 124, shaft 118 rotates in an oscillating manner, in directions referenced by arrows 150 and 152. When controlling the power output of electric power source 122, and thus controlling the value of the current flowing in windings 124, shaft 118 rotates by an angle corresponding to the controlled current. The frequency of these rotary oscillations can be controlled by controlling the rate of change of the direction of flow of the current. The rate of change of the angular movement of shaft 118 can be controlled by controlling the rate of change of the value of the current.

It is noted that since the number of windings 124 which are embedded in the layers of armature 102 is substantially large, the current density in windings 124 (i.e., the current/volume ratio) is substantially large. Thus, device 100 produces a substantially large torque $T_M$ in a substantially small physical volume, which exhibits a small moment of inertia. Furthermore, since the density of armature 102 is substantially small, the mass thereof is substantially small and thus, the specific current (i.e., the current/weight ratio) produced in armature 102 is substantially large.

The relation between torque $T_M$ and the moment of inertia $I_M$ of armature 102 and angular acceleration dω/dt of armature 102 is expressed by, $$T_M = I_M (d\omega/dt) \quad (4)$$

Since the mass of armature 102 is substantially small, the value of the moment of inertia $I_M$ is substantially small too. Thus, for a given applied torque $T_M$ (which according to the disclosed technique is relatively large), the value of angular acceleration dω/dt is relatively large (i.e., device 100 provides relatively large angular accelerations of shaft 118 and of light reflector 120). Light reflector 120 reflects the incident light. Thus, device 100 can be employed for example, as part of a highly compact, accurate, high frequency and high force scanner. It is noted that the use of a PCB in construction of armature 102, provides device 100 important cost effective attributes.

It is further noted that instead of employing counteractive-torque producing element 116, the shaft can be made of a torsion bar which stores kinetic energy when rotated and releases this kinetic energy, when the torque $T_M$ is substantially zero. In this case, one end of the shaft is coupled with the center of the armature, the other end thereof is coupled with the housing of device 100 and the light reflector is coupled to the shaft, at a location between the two ends of the shaft.

In case any of magnetic field inducers 108, 110, 112 and 114 is an electromagnet, the electromagnet is coupled with electric power source 122 and the controller controls the direction and the strength of the magnetic field of the electromagnet. It is noted that any of portions 126A, 128A, 130A, 132A, 126B, 128B, 130B and 132B can be made of either an electromagnet or a permanent magnet.

Alternatively, one of plates 104 or 106 is disposed of and four magnetic field inducers similar to portions 126A, 128A, 130A and 132A are located on the remaining plate, only on one side of the armature. Further alternatively, portions 126A, 128A, 130A and 132A are made of an electromagnet or a permanent magnet and portions 126B, 128B, 130B and 132B are made of a ferrous object. Alternatively, portions 126B, 128B, 130B and 132B are disposed of and plate 106 is made entirely of a ferrous material.

Further alternatively, counteractive-torque producing element 116 includes one or more electromagnetic coils (not shown) which are located in the vicinity of shaft 118 (e.g., surrounding shaft 118) and shaft 118 is made of a ferrous material. The electromagnetic coil is coupled with electric power source 122. The applied electric power produces an electromagnetic field, an electromagnetic force $F_E$ and a respective torque $T_E$ which acts in a direction opposite to that of torque $T_M$. The controller can control the value and the direction of the electromagnetic field. Instead of the electromagnetic coils, one or more permanent magnets can be employed.

It is noted that the torque $T_M$ is substantially constant up to an angle α of rotation of shaft 118. Up to this point, since the rectangular path of windings 124 completely overlaps magnetic field inducers 108, 110, 112 and 114, the magnetic flux in windings 124 is constant. Past this point, magnetic field inducers 108, 110, 112 and 114 only partially overlap the rectangular path of windings 124, and thus, the magnetic flux in windings 124, and the value of torque $T_M$ drop considerably.

When electric power source 122 applies a current $A_1$ to windings 124, armature 102 rotates by α where the value of torque $T_M$ is substantially equal to the torque $T_S$. Throughout this rotation, the positions of magnetic field inducers 108, 110, 112 and 114 relative to the four corners of windings 124, are such that the value of the magnetic flux in windings 124 is maximal and the resultant force $F_M$ is substantially constant. If at this point electric power source 122 applies a current $A_2 > A_1$ to windings 124, armature 102 rotates slightly to such a position relative to magnetic field inducers 108, 110, 112 and 114, that the value of this magnetic flux, the resultant force $F_M$ and thus the torque $T_M$ drops substantially.

In the example set forth in FIG. 1A, device 100 is employed as a scanner. It is noted that a device similar to device 100 can be employed in a gyroscope, where precession angular velocity depends on moment value. Please delete text in square brackets to produce a torque to counteract a substantially small angular displacement, velocity, acceleration, impulse, and the like. In this case, the spring and the light reflector are disposed of and one or more weights and a motion detector are coupled with the shaft. The motion detector is an armature-field assembly, which detects dynamic parameters of the shaft, such as angular speed, angular acceleration, and the like. The motion detector can be made of a combination of a coil and a magnet, as known in the art, or be similar to the combination of armature 102 and plates 104 and 106.

The windings of the armature are coupled with an electric power source and a controller is coupled with the electric power source and with the windings of the motion detector. When one or more of the weights are accelerated (e.g., due to a change in direction of travel of a vehicle), a respective moment is applied to the shaft. In this case, the weights which in this way apply a moment to the shaft, can be regarded as a counteractive-torque producing element which apply a counteractive torque to the shaft. The motion detector detects the applied moment and the controller applies an electric power to the armature, to counteract the applied moment and thus prevent the shaft to rotate and keep the shaft substantially stationary.

It is further noted that the number of magnetic field inducers is not restricted to four, and that any number of magnetic field inducers (and at least one), can be employed with the device.

Figure 2:
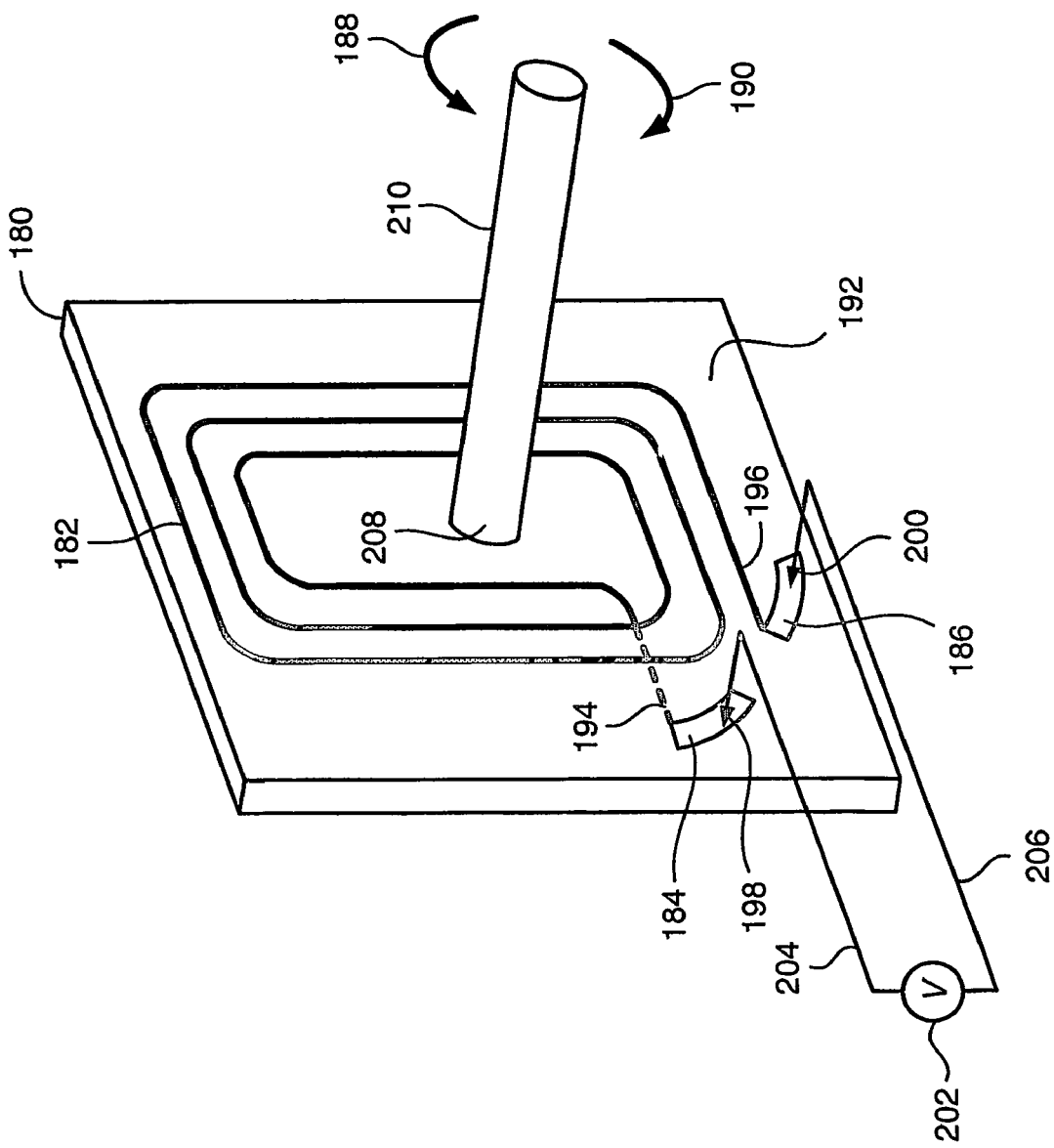
FIG. 2 is a schematic illustration of the armature of FIG. 1A, constructed and operative in accordance with another embodiment of the disclosed technique.

Reference is now made to FIG. 2, which is a schematic illustration of the armature of FIG. 1A, generally referenced 180, constructed and operative in accordance with another embodiment of the disclosed technique. Armature 180 includes a plurality of windings generally referenced 182 and electrically conductive contact regions 184 and 186. Armature 180 and windings 182 are similar to armature 102 and windings 124, respectively, as described herein above in connection with FIG. 1A.

Armature 180 is free to oscillate in angular directions designated by arrows 188 and 190. Each of electrically conductive contact regions 184 and 186 is located on a surface 192 of armature 180. Electrically conductive contact regions 184 and 186 are coupled with two ends 194 and 196 of windings 182, respectively. Each of electrically conductive contact regions 184 and 186 is made of an electrically conductive material, such as lead, silver, gold, copper, nickel, tin, indium, and the like. Electrically conductive contact regions 184 and 186 can be etched on surface 192 in a photolithography procedure, and the like.

Two electrical contacts 198 and 200 are in contact with electrically conductive contact regions 184 and 186, respectively. Electrical contacts 198 and 200 are stationary relative to armature 180. Electrical contacts 198 and 200 can be coupled with a housing (not shown), which confines armature 180. Electrical contacts 198 and 200 are coupled with an electric power source 202, via wires 204 and 206. Electric power source 202 is similar to electric power source 122, as described herein above in connection with FIG. 1A. Electric power source 202 can be coupled with a controller similar to the one described herein above in connection with FIG. 1A. Thus, electric power source 202 provides electric power to windings 182, via electrical contacts 198 and 200, and electrically conductive contact regions 184 and 186.

Each of electrically conductive contact regions 184 and 186 is in form of an arc of a circle (not shown). The centers of these two circles are located substantially at a center of rotation 208 of armature 180. A shaft 210 is coupled with armature 108, at center of rotation 208. The radii of the two circles of the arcs of electrically conductive contact regions 184 and 186, and the lengths of these two arcs, are such that as armature 180 oscillates in directions 188 and 190, electrical contacts 198 and 200 are in contact with electrically conductive contact regions 184 and 186, respectively, at all times. A pressure application element (not shown), such as a spring, and the like, forces electrical contacts 198 and 200 toward electrically conductive contact regions 184 and 186, respectively, such that electrical contacts 198 and 200 are in contact with electrically conductive contact regions 184 and 186, respectively, at all times. The force provided by the pressure application element is large enough to maintain the contact and small enough to allow rotation of armature 180, with a minimum of torque $T_M$ applied to armature 180.

Figure 3C:
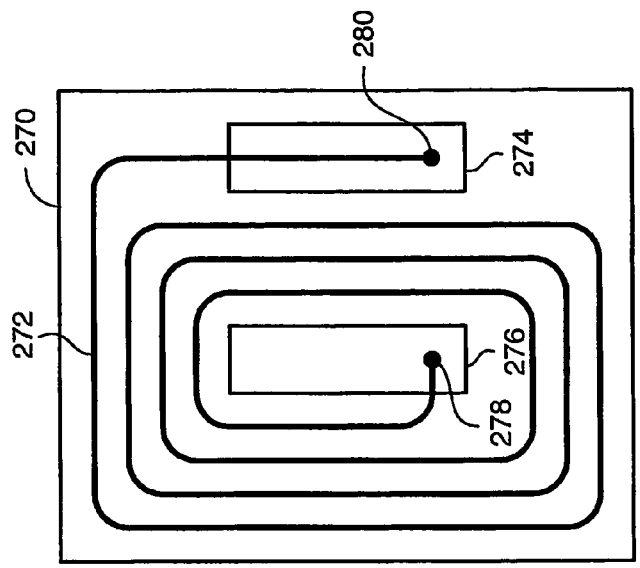
FIG. 3C is a schematic illustration of a third winding layer of the armature of the device of FIG. 1A.
Figure 3B:
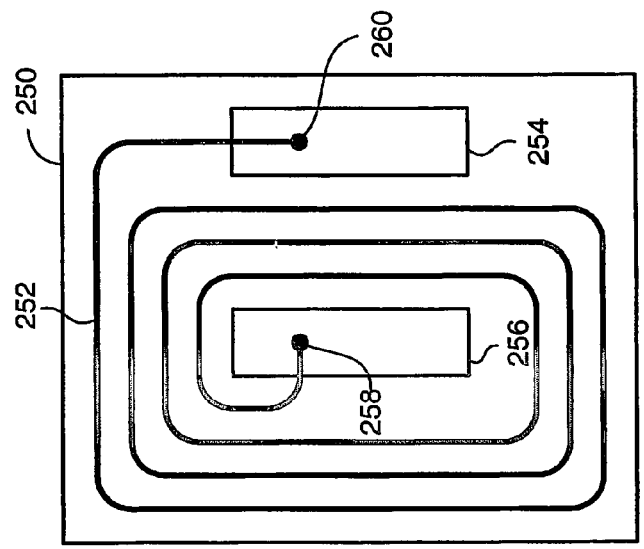
FIG. 3B is a schematic illustration of a second winding layer of the armature of the device of FIG. 1A.
Figure 3A:
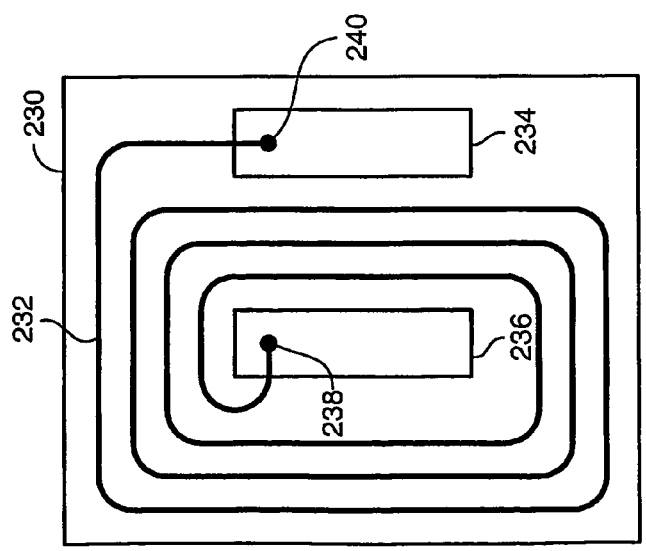
FIG. 3A is a schematic illustration of a first winding layer of the armature of the device of FIG. 1A.
Figure 3D:
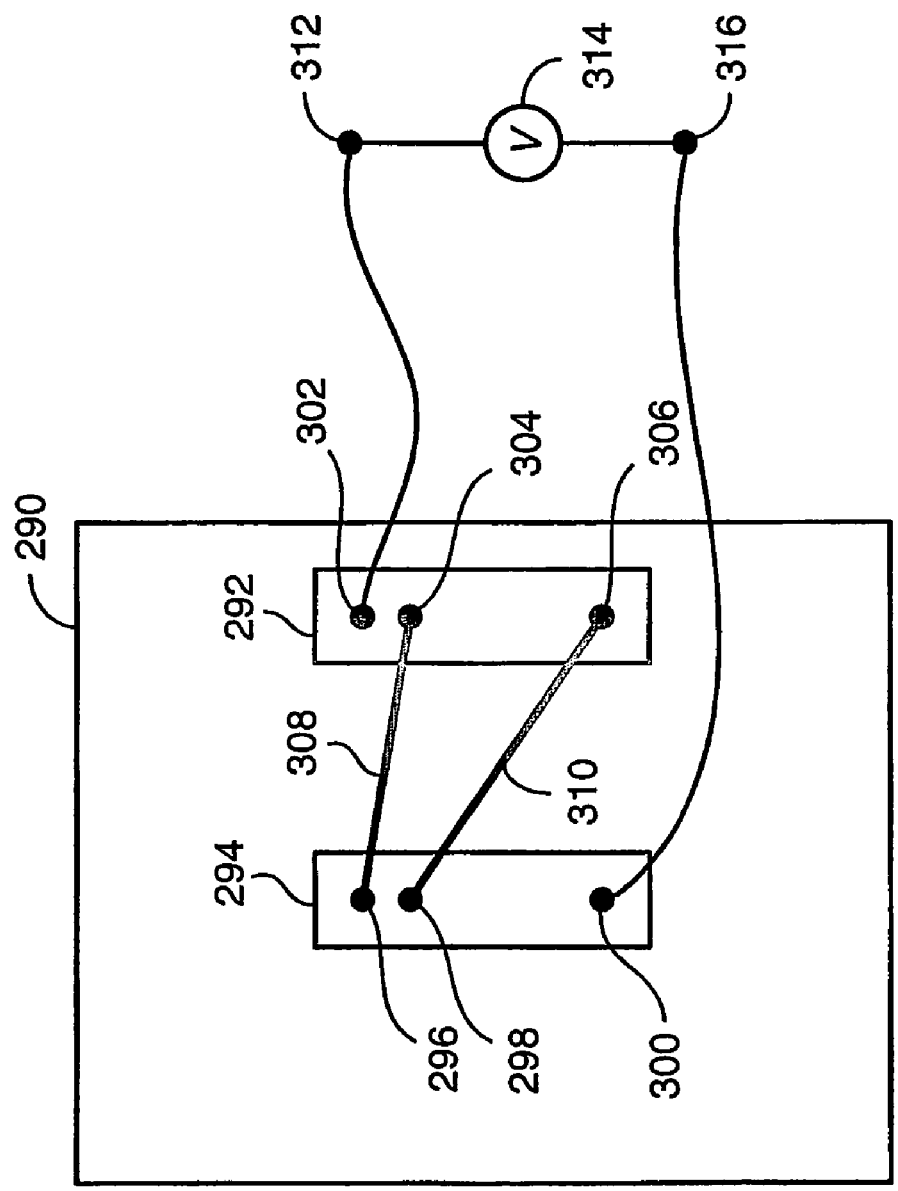
FIG. 3D is a schematic illustration of a control layer of the armature of the device of FIG. 1A, coupled with an electric power source.

Reference is now made to FIGS. 3A, 3B, 3C and 3D. FIG. 3A is a schematic illustration of a first winding layer of the armature of the device of FIG. 1A, generally referenced 230. FIG. 3B is a schematic illustration of a second winding layer of the armature of the device of FIG. 1A, generally referenced 250. FIG. 3C is a schematic illustration of a third winding layer of the armature of the device of FIG. 1A, generally referenced 270. FIG. 3D is a schematic illustration of a control layer of the armature of the device of FIG. 1A, generally referenced 290, coupled with an electric power source.

In the example set forth in FIGS. 3A, 3B, 3C and 3D, an armature similar to armature 102 (FIG. 1A), includes three winding layers and a control layer. However, it is noted that the armature can include a plurality of winding layers. Winding layer 230 includes a winding 232, contact regions 234 and 236, and contact points 238 and 240. Winding layer 250 includes a winding 252, contact regions 254 and 256, and contact points 258 and 260. Winding layer 270 includes a winding 272, contact regions 274 and 276, and contact points 278 and 280. Control layer 290 includes contact regions 292 and 294, and contact points 296, 298, 300, 302, 304 and 306.

Windings 232, 252 and 272 are similar to windings 124 as described herein above in connection with FIG. 1A. Winding layer 250 is located between winding layers 230 and 270, and winding layer 270 is located between winding layer 250 and control layer 290.

A contact region of a PCB refers to a region of the PCB which includes a plurality of contact points, circuit control elements (e.g., temperature switch, current regulator, voltage regulator), and the like. A contact point is electrically coupled with one or more other contact points by an electrical connection (e.g., a winding) which is etched on the PCB. Contact points 240 and 238 are located in contact regions 234 and 236, respectively. Contact points 260 and 258 are located in contact regions 254 and 256, respectively. Contact points 280 and 278 are located in contact regions 274 and 276, respectively.

Contact points 296, 298 and 300 are located in contact region 294. Contact points 302, 304 and 306 are located in contact region 292.

The two ends of winding 232 are coupled with contact points 238 and 240. The two ends of winding 252 are coupled with contact points 258 and 260. The two ends of winding 272 are coupled with contact points 278 and 280. Contact points 296 and 304 are coupled together by an etched connection 308. Contact points 298 and 306 are coupled together by an etched connection 310.

The dimensions of winding layers 230, 250 and 270 and control layer 290, are substantially the same. The location and dimensions of contact regions 234, 254, 274 and 292 on winding layers 230, 250 and 270 and on control layer 290, respectively, are substantially identical. The location and dimensions of contact regions 236, 256, 276 and 294 on winding layers 230, 250 and 270 and on control layer 290, respectively, are substantially identical. Thus, when winding layers 230, 250 and 270 and control layer 290 are assembled on the top of one another, contact point 302 lines up with contact point 240, contact point 304 lines up with contact point 260 and contact point 306 lines up with contact point 274. Likewise, contact point 296 lines up with contact point 238, contact point 298 lines up with contact point 258, and contact point 300 lines up with contact point 278.

A thru-hole passes through winding layers 230, 250 and 270 and control layer 290, at each of contact points 296, 298, 300, 302, 304 and 306. Each of the thru-holes is made of a conductive material. Hence, if one or more contact points on different layers are lined up along the same thru-hole, these contact points are electrically coupled together. Hence, contact point 302 is coupled with contact point 240, contact point 304 is coupled with contact point 260 and contact point 306 is coupled with contact point 280. Likewise, contact point 296 is coupled with contact point 238, contact point 298 is coupled with contact point 258, and contact point 300 is coupled with contact point 278. Furthermore, the end 238 of winding 232 is coupled with the end 260 of winding 252, via etched connection 308 and the end 258 of winding 252 is coupled with the end 280 of winding 272, via etched connection 310. In this manner, windings 232, 252 and 272 are coupled together, thereby forming a substantially large number of windings in a substantially small physical space of the armature.

A terminal 312 of an electric power source 314 is coupled with contact point 302 and a terminal 316 of electric power source 314 is coupled with contact point 300. In this manner, electric power source 314 applies an electric power to windings 232, 252 and 272.

It will be appreciated by persons skilled in the art that the disclosed technique is not limited to what has been particularly shown and described hereinabove. Rather the scope of the disclosed technique is defined only by the claims, which follow.

The invention claimed is:

1. A device for producing torque, the device comprising:
   an armature made of a printed circuit board, said armature being rotatable about a rotation axis;
   at least one winding formed on said armature in a substantially rectangular spiral path;
   at least one magnetic field inducer, each of said at least one magnetic field inducer being located in the vicinity of a respective corner of said substantially rectangular spiral path, each of said at least one magnetic field inducer producing a magnetic field along a magnetic axis in a selected direction, said selected direction being opposite to another selected direction respective of an adjacent magnetic field inducer, each of said magnetic axes being substantially normal to said substantially rectangular spiral path, said at least one winding and said at least one magnetic field inducer applying said torque on said armature, when electric power is applied to said at least one winding, said torque being at a torque level respective of a selected power level; and
   a counteractive torque producing element coupled with said armature, said counteractive torque producing element applying a counteractive torque on said armature in a direction opposite to that of said torque.

2. The device according to claim 1 wherein said armature rotates from a first position to a second position, when said electric power at a first power level is applied to said at least one winding,
   wherein said counteractive torque producing element stores the mechanical energy of said torque, and
   wherein said counteractive torque producing element applies said counteractive torque on said armature by releasing at least a portion of said stored mechanical energy, when said electric power at a second power level is applied to said at least one winding, thereby rotating said armature from said second position toward said first position.

3. The device according to claim 2 wherein said second power level is lower than said first power level.

4. The device according to claim 1 wherein said second power level is substantially zero.

5. The device according to claim 1 further comprising a shaft coupled with said armature, said shaft rotating about said rotation axis, the longitudinal axis of said shaft being substantially perpendicular to said armature.

6. The device according to claim 5 further comprising a motion detector coupled with said shaft and with a controller, said shaft being coupled with said counteractive torque producing element,
   wherein said counteractive torque producing element applies said counteractive torque on said shaft, said counteractive torque being substantially equal to the product of a component of a force acting on said shaft and a moment arm of said component, said moment arm being substantially normal to said rotation axis, said component being substantially normal to said moment arm,
   wherein said motion detector detects said counteractive torque and provides a signal to said controller respective of said detected counteractive torque,
   wherein an electric power source is coupled with said controller and with said at least one winding,
   wherein said controller determines said electric power at said selected power level, according to said signal, to be applied to said at least one winding, said electric power producing said torque in a direction and of a value opposite to those of said counteractive torque, to prevent said armature to rotate as a result of said counteractive torque, and
   wherein said electric power source applies said determined electric power to said at least one winding, to maintain said armature in a substantially stationary position.

7. The device according to claim 5 further comprising a light reflector coupled with said shaft.

8. The device according to claim 1 wherein at least one of said at least one magnetic field inducer comprises at least one permanent magnet.

9. The device according to claim 1 wherein at least one of said at least one magnetic field inducer comprises at least one permanent magnet and at least one ferrous object.

10. The device according to claim 1 wherein at least one of said at least one magnetic field inducer comprises at least one electromagnet.

11. The device according to claim 10 wherein at least one of said at least one electromagnet includes a ferrous core.

12. The device according to claim 1 wherein at least one of said at least one magnetic field inducer comprises at least one electromagnet and at least one ferrous object.

13. The device according to claim 1 wherein said at least one magnetic field inducer is located at one side of said armature.

14. The device according to claim 1 wherein a first portion of each of said at least one magnetic field inducer is located at one side of said armature and a second portion of each of said at least one magnetic field inducer is located at the other side of said armature, opposite to said first portion.

15. The device according to claim 1 further comprising:
a first plate being substantially stationary relative to said armature and substantially parallel with said armature; and
a second plate being substantially stationary relative to said armature and substantially parallel with said armature,
wherein said armature is located between said first plate and said second plate, and
wherein said at least one magnetic field inducer is fixed to said first plate.

16. The device according to claim 15 wherein said second plate is made of a ferrous material.

17. The device according to claim 1 further comprising:
a first plate being substantially stationary relative to said armature and substantially parallel with said armature; and
a second plate being substantially stationary relative to said armature and substantially parallel with said armature,
wherein said armature is located between said first plate and said second plate, and
wherein at least one of said at least one magnetic field inducer is fixed to said first plate, and at least another one of said at least one magnetic field inducer is fixed to said second plate.

18. The device according to claim 1 wherein said at least one winding are coupled together in a form selected from the list consisting of:
series;
parallel; and
a combination of the above.

19. The device according to claim 1 wherein said printed circuit board comprises a plurality of printed circuit board layers.

20. The device according to claim 1 wherein said electric power is applied across said at least one winding, via a pair of wires coupled between an electric power source and said at least one winding.

21. The device according to claim 20 wherein said electric power source provides a voltage selected from the list consisting of:
direct; and
alternating.

22. The device according to claim 1 wherein said electric power is applied across said at least one winding, via a pair of electric contacts movably in contact with a pair of electrically conductive contact regions on said armature, said pair of electrically conductive contact regions being coupled with two ends of said at least one winding.

23. The device according to claim 1 wherein said armature further rotates in an oscillatory manner.

24. The device according to claim 1 wherein said counter-active torque producing element is selected from the list consisting of:
mechanical spring;
magnet spring; and
fluid spring.

25. The device according to claim 24 wherein said magnet spring comprises at least one magnetic element selected from the list consisting of:
permanent magnet; and
electromagnet.

26. The device according to claim 1 wherein said device further comprises an electric power source coupled with said at least one winding, said electric power source providing said electric power.

27. The device according to claim 26 wherein said device further comprises a controller coupled with said electric power source, said controller controlling at least one electric parameter of said electric power source.

28. The device according to claim 27 wherein said at least one electric parameter is selected from the list consisting of:
current flow direction;
current value;
rate of change of said current flow direction; and
rate of change of said current value.

* * * * *